United States Patent
Tykowski et al.

(10) Patent No.: US 7,693,314 B2
(45) Date of Patent: Apr. 6, 2010

(54) FINGER SENSING DEVICE FOR NAVIGATION AND RELATED METHODS

(75) Inventors: Joseph Andrew Tykowski, Oviedo, FL (US); James Warren Neil, Melbourne, FL (US); Kuntal Sengupta, West Melbourne, FL (US)

(73) Assignee: Authentec, Inc., Melbourne, FL (US)

( * ) Notice: Subject to any disclaimer, the term of this patent is extended or adjusted under 35 U.S.C. 154(b) by 1028 days.

(21) Appl. No.: 11/249,585

(22) Filed: Oct. 13, 2005

(65) Prior Publication Data

US 2006/0088195 A1 Apr. 27, 2006

Related U.S. Application Data

(60) Provisional application No. 60/618,399, filed on Oct. 13, 2004, provisional application No. 60/618,401, filed on Oct. 13, 2004.

(51) Int. Cl.
G06K 9/00 (2006.01)

(52) U.S. Cl. ........................ 382/124; 382/115; 382/125; 382/126; 382/276

(58) Field of Classification Search ................. 382/124, 382/125, 126, 276, 115
See application file for complete search history.

(56) References Cited

U.S. PATENT DOCUMENTS

| | | | | |
|---|---|---|---|---|
| 4,904,855 A * | 2/1990 | Nishibe et al. | ............ | 250/201.8 |
| 4,933,976 A | 6/1990 | Fishbine et al. | ................. | 382/4 |
| 5,963,679 A | 10/1999 | Setlak | .......................... | 382/312 |
| 6,002,815 A | 12/1999 | Immega et al. | ............... | 382/312 |
| 6,057,540 A * | 5/2000 | Gordon et al. | ............... | 250/221 |
| 6,088,585 A * | 7/2000 | Schmitt et al. | ............... | 455/411 |
| 6,134,340 A * | 10/2000 | Hsu et al. | ................... | 382/124 |
| 6,241,288 B1 * | 6/2001 | Bergenek et al. | ............... | 283/67 |
| 6,289,114 B1 | 9/2001 | Mainguet | ..................... | 382/124 |
| 6,333,989 B1 | 12/2001 | Borza | ......................... | 382/124 |
| 6,459,804 B2 | 10/2002 | Mainguet | ..................... | 382/124 |
| 6,483,932 B1 | 11/2002 | Martinez et al. | ............ | 382/124 |
| 7,031,501 B2 * | 4/2006 | Adachi et al. | ................ | 382/124 |
| 7,039,223 B2 * | 5/2006 | Wong | ........................ | 382/124 |
| 7,197,168 B2 * | 3/2007 | Russo | ........................ | 382/125 |
| 2001/0005221 A1 | 6/2001 | Huang | ........................ | 348/222 |

(Continued)

FOREIGN PATENT DOCUMENTS

EP 1 096 778 5/2001

OTHER PUBLICATIONS

"MBF200 Solid-State Fingerprint Sensor", Fujitsu Microelectronics America, Inc., 2003, available at www.fma.fulitsu.com.

*Primary Examiner*—Bhavesh M Mehta
*Assistant Examiner*—Stephen R Koziol
(74) *Attorney, Agent, or Firm*—Allen, Dyer, Doppelt, Milbrath & Gilchrist, P.A.

(57) ABSTRACT

A finger sensing device may include a finger sensing area to receive a user's finger moved in a sliding motion, and a controller cooperating with the finger sensing area for generating successive image samples at least some of which are separated by different time intervals. The controller may generate finger movement signals based upon the successive image samples and the different time intervals. The controller may generate a plurality of repeating groups of ratio-metrically related image samples based upon the different time intervals. The reduced number of image samples may provide greater processing efficiency and reduced power consumption.

44 Claims, 6 Drawing Sheets

U.S. PATENT DOCUMENTS

| | | |
|---|---|---|
| 2001/0017934 A1 | 8/2001 | Paloniemi et al. ............ 382/107 |
| 2002/0012455 A1 | 1/2002 | Benckert .................... 382/124 |
| 2002/0028004 A1* | 3/2002 | Miura et al. ................ 382/124 |
| 2003/0002718 A1 | 1/2003 | Hamid ....................... 382/124 |
| 2003/0091219 A1 | 5/2003 | Martinez et al. ............ 382/124 |
| 2003/0123714 A1 | 7/2003 | O'Gorman et al. .......... 382/124 |
| 2003/0126448 A1 | 7/2003 | Russo ........................ 713/186 |
| 2003/0156744 A1 | 8/2003 | Hashimoto .................. 382/124 |
| 2003/0194114 A1 | 10/2003 | Mitsuyu et al. ............. 382/124 |
| 2004/0052407 A1 | 3/2004 | Kawabe ...................... 382/124 |
| 2004/0130532 A1 | 7/2004 | Gordon et al. ............. 345/166 |
| 2004/0208348 A1 | 10/2004 | Baharav et al. ............ 382/124 |
| 2005/0012714 A1 | 1/2005 | Russo et al. ................ 345/157 |
| 2005/0047633 A1* | 3/2005 | Morguet ..................... 382/124 |
| 2005/0078855 A1 | 4/2005 | Chandler et al. ............ 382/116 |
| 2005/0089203 A1 | 4/2005 | Setlak ........................ 382/124 |
| 2005/0179657 A1 | 8/2005 | Russo et al. ................ 345/163 |
| 2005/0271259 A1* | 12/2005 | Lorch et al. ................ 382/124 |

\* cited by examiner

FINGER SENSING DEVICE FOR NAVIGATION AND RELATED METHODS

RELATED APPLICATIONS

This application is based upon prior filed copending provisional applications Ser. Nos. 60/618,399 and 60/618,401 both filed Oct. 13, 2004, the entire subject matter of both of which is incorporated herein by reference in its entirety.

FIELD OF THE INVENTION

The invention relates to the field of electronic devices, and, more particularly, to sensors, such as for finger sensing, and electronic devices using such sensors and related methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,963,679 to Setlak and assigned to the assignee of the present invention. The fingerprint sensor is an integrated circuit sensor that drives the user's finger with an electric field signal and senses the electric field with an array of electric field sensing pixels on the integrated circuit substrate. Such sensors are used to control access for many different types of electronic devices such as computers, cell phones, personal digital assistants (PDA's), and the like. In particular, fingerprint sensors are used because they may have a small footprint, are relatively easy for a user to use, and they provide reasonable authentication capabilities.

U.S. Published Patent Application No. 2005/0089203 also to Setlak and assigned to the assignee of the present invention discloses an integrated circuit biometric sensor that may sense multiple biometrics of the user, and that is also adapted to either a static placement sensor or a slide finger sensor. A slide finger sensor includes a smaller sensing surface over which the user's finger is slid. The images collected during the sliding process may be collected for matching, such as for authentication, or may be used for navigation, for example.

U.S. Published Patent Application No. 2005/0078855 to Chandler et al., and assigned to the assignee of the present invention, discloses a finger sensor used for navigation. More particularly, a processor is coupled to the finger sensing area to generate a plurality of menu items on a display, and for scrolling an indicator along the menu items based upon static placement of a finger adjacent a selected portion of the sensing area.

U.S. Published Patent Application No. 2001/0017934 to Palonieme et al. discloses a cellular telephone including a finger sensor for sensing surface the relief areas of human skin, and a movement detector for detecting movement of skin across the sensor. A user interface is responsive to the finger sensor to perform navigation functions.

U.S. Published Patent Application No. 2005/0012714 to Russo et al. also discloses a finger sensor used in a portable electronic device that translates a difference between first and second positions on the sensor into a plurality of sets of signals. Each set of signals may be used to emulate the signals generated by an input device, such as a steering wheel, a mouse, a joystick, a navigation bar, a scroll wheel, and a pressure sensitive button.

Unfortunately, prior art finger sensors used for navigation typically required a series of images or image samples, equally spaced in time, each one compared with the previous one, to estimate X-Y motion. The sampling interval was desirably short enough to capture the fastest motion expected. This may be both time and power consuming.

SUMMARY OF THE INVENTION

In view of the foregoing background, it is therefore an object of the present invention to provide a finger sensing device and associated methods with more efficient image processing and reducing power consumption.

This and other objects, features, and advantages in accordance with the present invention are provided by a finger sensing device comprising a finger sensing area to receive a user's finger moved in a sliding motion, and a controller cooperating with the finger sensing area for generating successive image samples at least some of which are separated by different time intervals, and for generating finger movement signals based upon the successive image samples and the different time intervals. More particularly, the controller may generate a plurality of repeating groups of ratio-metrically related image samples based upon the different time intervals. For example, the finger sensing array may include an array of sensing pixels, and with a ratio for the ratio-metrically related image samples being less than or equal to an expected pixel motion value. The ratio-metrically related image samples may be based upon at least one of 3:1 and 4:1 ratio-metrically related image samples. The reduced number of samples may provide greater processing efficiency and reduced power consumption.

The controller may generate a finger speed estimate based upon comparisons of image sample pairs in a given group. The controller may also select and correlate an image sample pair based upon the comparisons of image sample pairs in the given group to thereby generate a finger displacement estimate. The controller may perform a contrast check on the selected image sample pair.

The controller may generate the finger movement signals based upon the finger speed estimate and the finger displacement estimate. For example, the controller may generate the finger movement signals from the finger speed estimate and the finger displacement estimate based upon at least one of a comparison to a look-up table and a piece-wise interpolation.

The controller may apply a set of filtering rules to at least one of the finger speed estimate and the finger displacement estimate. In addition, the controller may generate finger movement signals for both X and Y directions. The image samples may comprise respective subsets of image data available from the finger sensing area.

The sensing area may include an array of electric field sensing pixels, for example. The finger sensing device may be included in an electronic device comprising a housing and a display carried by the housing. In these embodiments, the controller may generate finger movement signals for at least one navigation operation on the display and based upon the successive image samples and the different time intervals. The navigation operation may include cursor movement control, for example.

A method aspect is directed to generating finger movement signals using a finger sensing device comprising a finger sensing area to receive a user's finger moved in a sliding motion, and a controller connected to the finger sensing area. The method may include using the controller in cooperation with the finger sensing area for generating successive image samples at least some of which are separated by different time intervals, and for generating finger movement signals based upon the successive image samples and the different time intervals. The ratio-metric sampling may be applied to other applications, such as an image sensor including an image sensing area for sensing movement of a target, for example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout indicate similar elements.

Figure 1:
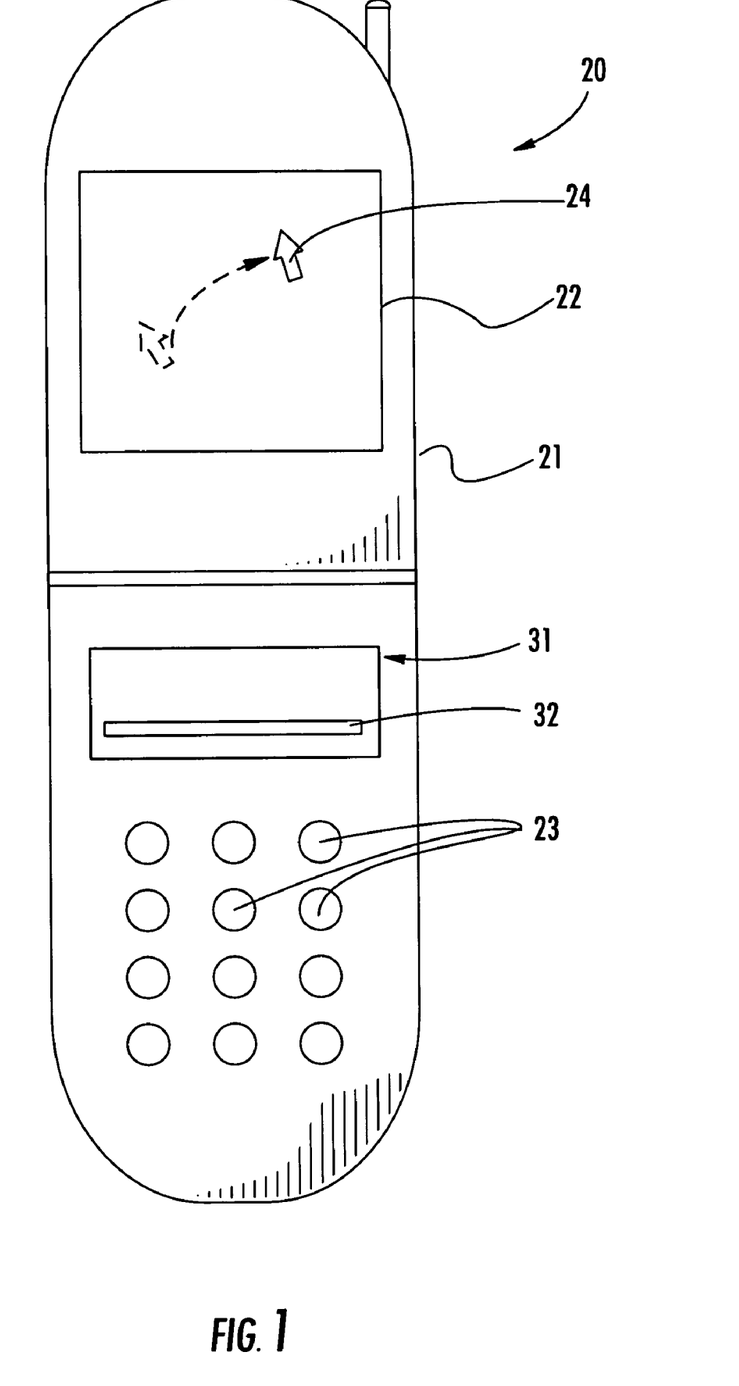
FIG. 1 is schematic front elevational view of an electronic device in the form of a cellular telephone and including a finger sensing device in accordance with the present invention.
Figure 2:
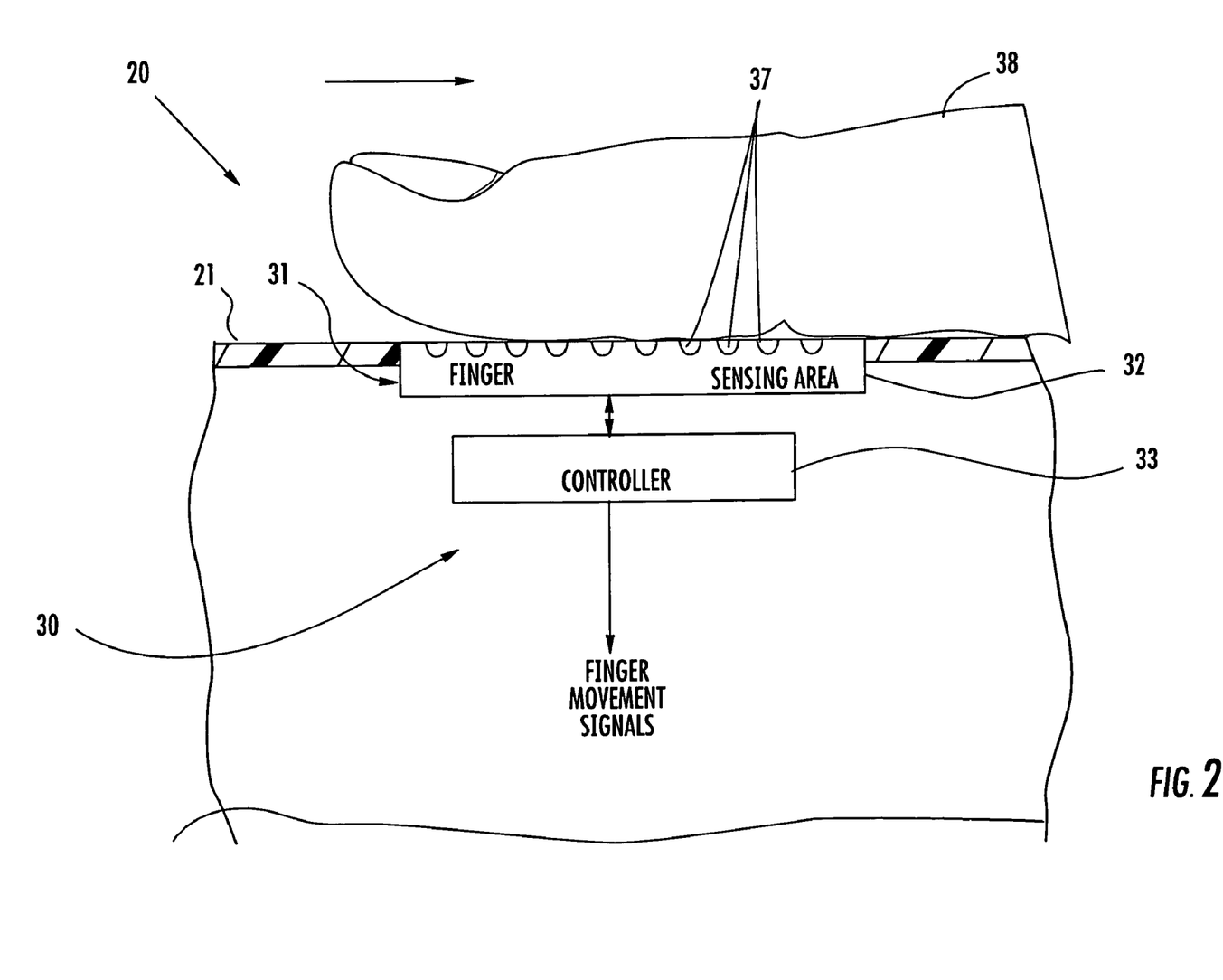
FIG. 2 is more detailed schematic diagram of a portion of the cellular telephone as shown in FIG. 1.

Referring initially to FIGS. 1 and 2 an electronic device in the form of a cellular telephone 20 includes the finger sensing device 30 according to the invention. The cellular telephone 20 is but one example of an electronic device that may benefit from the finger sensing device 30 as will be appreciated by those skilled in the art. The illustrated cellular telephone 20 includes a portable housing 21 that carries a display 22 and a keyboard 23. An integrated circuit finger sensor 31 is carried by the housing 21 and includes a finger sensing area 32 to receive a user's finger 38 (FIG. 2) moved in a sliding motion. The finger sensing area 32 may typically sense the image of ridges and valleys of a fingerprint, or may image other features of the user's finger, such as pores, or even subdermal features, as will be appreciated by those skilled in the art. Of course, other finger sensors could also be used.

The finger sensor 31 illustratively includes a controller 33 cooperating with the finger sensing area 32 for collecting image data therefrom. In some embodiments, the controller 33 may be provided by processing circuitry included on the integrated circuit substrate with the finger sensing area 32, and a host processor (not shown) as typically carried by the housing 21. Such a host processor for the cellular telephone 20 may typically perform the traditional processing for telephone functions, and may also have additional processing capability available for finger matching, finger navigation, etc. as will be appreciated by those skilled in the art. In other embodiments, the controller 33 may be implemented totally along with the finger sensing area 32 or in a separate integrated circuit as will also be appreciated by those skilled in the art. As described in greater detail below, the controller 33 can be used to generate finger movement signals, such as for navigation, that is, for control of a cursor 24 of the display 22.

The finger sensing area 32 illustratively includes an array of sensing pixels, such as electric field sensing pixels 37 formed on an integrated circuit substrate of the type as described in U.S. Pat. No. 5,963,679 to Setlak et al., assigned to the assignee of the present invention, and the entire contents of which are incorporated herein by reference. Of course, the finger sensing device 30 may be based upon other types of finger sensing as will be appreciated by those skilled in the art.

The controller 33 cooperates with the finger sensing area 32 for generating successive image samples at least some of which are separated by different time intervals, and for generating finger movement signals based upon the successive image samples and the different time intervals. The controller 33 may generate a plurality of repeating groups of ratio-metrically related image samples based upon the different time intervals.

As explained in further detail below, the ratio for the ratio-metrically related image samples may be less than or equal to an expected pixel motion value. The ratio-metrically related image samples may be based upon at least one of 3:1 and 4:1 ratio-metrically related image samples. The reduced number of image samples may provide greater processing efficiency and reduced power consumption.

The controller 33 may generate a finger speed estimate based upon comparisons of image sample pairs in a given group. The controller 33 may also select and correlate an image sample pair based upon the comparisons of image sample pairs in the given group to thereby generate a finger displacement estimate. The controller 33 may perform a contrast check on the selected image sample pair.

The controller 33 may generate the finger movement signals based upon the finger speed estimate and the finger displacement estimate. For example, the controller 33 may generate the finger movement signals from the finger speed estimate and the finger displacement estimate based upon at least one of a comparison to a look-up table and a piece-wise interpolation.

The controller 33 may apply a set of filtering rules to at least one of the finger speed estimate and the finger displacement estimate. The controller 33 may also generate finger movement signals for both X and Y directions. The image samples may comprise respective subsets of image data available from the finger sensing area.

A method aspect is directed to generating finger movement signals using a finger sensing device 30 comprising a finger sensing area 32 to receive a user's finger moved in a sliding motion, and a controller 33 connected to the finger sensing area. The method may include using the controller 33 in cooperation with the finger sensing area 32 for generating successive image samples at least some of which are separated by different time intervals, and for generating finger movement signals based upon the successive image samples and the different time intervals. The ratio-metric sampling may be applied to other applications, such as an image sensor including an image sensing area for sensing movement of a target, for example.

By use of the sparse sampling algorithm, the finger sensing device 30 significantly reduces the power and processing overhead without sacrificing performance for navigations tasks, such as cursor control, tracking, etc. as required of many of today's electronic devices and as compared to conventional correlation techniques. This may be accomplished by using a prediction strategy to data collected at strategically selected sparse intervals. Much of the information in a continuous stream of overlapping correlation samples may be redundant and not necessary to the navigation task.

An image sampling technique may be used by the controller 33 to estimate the motion. The controller 33 may use a speed estimator to determine the speed at which the finger or target object is moving with respect to the sensing area 32 and may perform a correlation between two images to determine the X-Y displacement. With the controller 33 sampling at a ratio-metric rate, the speed and displacement (velocity) can be estimated using less electrical power and fewer processor resources.

The sampling technique may be broken down as follows:
1. Ratio-metric sampling of images;
2. Speed estimation based on image samples;
3. Image contrast verification;
4. Image correlation based on estimated speed;
5. Motion filtering; and
6. Motion profiling.

Figure 3:
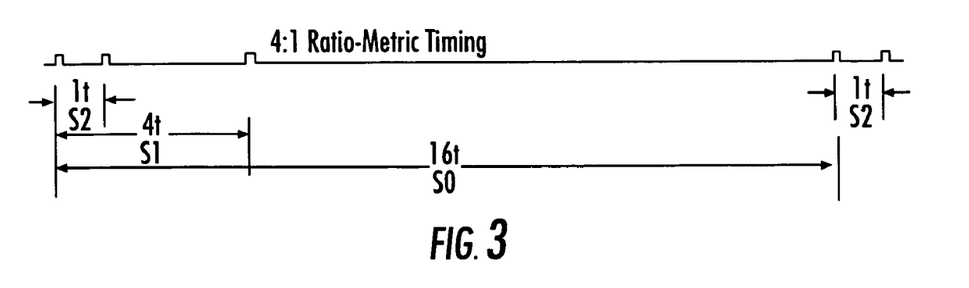
FIG. 3 is a 4:1 ratio-metric timing diagram as used in the finger sensing device shown in FIGS. 1 and 2.
Figure 4:
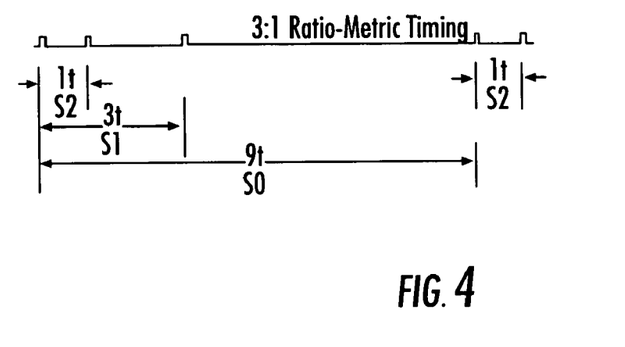
FIG. 4 is a 3:1 ratio-metric timing diagram as used in the finger sensing device shown in FIGS. 1 and 2.

As now explained with additional reference to FIGS. 3 and 4, instead of sampling images in a traditional linear method where the images are acquired at a constant frequency, the controller 33 may use a ratio-metric sampling rate. The samples are taken at times such that the ratio of times between subsequent images is constant. Each image pair therefore is characterized by a time spacing that differs by a multiplicative factor across the pairs. For any given set of ratio-metrically spaced images a single motion is derived. Comparing images in each pair followed by a decision process across all pairs allows the sensing of a wide range of velocities without the need to sample images densely spaced in time. This reduces power consumption. After a sufficient number of samples have been acquired, the timing sequence starts over again, as shown in the following diagram. The illustrated 4:1 (FIG. 3) and 3:1 (FIG. 4) timing examples both show four image samples for illustration, but the number of image samples may depend on the upper and lower speed thresholds for the desired response and may vary as will be appreciated by those skilled in the art.

Speed estimation is based on image based motion detection. The image based motion detection compares two image samples. The whole image or a sufficiently large subset of the image sample may be used. An example of a comparison operation is a bitwise exclusive-or operation, but is not limited to this. The score is proportional to the number of pixels where the images differ. If the score is lower than a preset threshold, then the image samples are deemed to be the same. If the image samples are the same, then the speed between those image samples is deemed to be zero. If the image samples are different, then the speed between those image samples is non-zero.

Image samples that are spaced closer in time detect faster speeds. As shown in FIGS. 3 and 4, the closest pair (1$t$) defines a speed, S2. The next closest pair is considered S1, and the farthest pair is S0. The result of performing image based motion detection on all of the image sample pairs is to estimate the image speed and to determine which pair of image samples to correlate for motion detection. The logic may be as follows. If no motion is detected in any image pairs, then the speed is zero; there is no motion. If only one pair shows motion, the speed is S0 (slowest), and the pair showing motion is correlated to determine the magnitude and direction of the motion. If two pairs show motion, then the speed is S1. If the S pair shows motion, use it for correlating the images; otherwise, use the next fastest (closest in time) image pair available. If all three pairs show motion, then the speed is S2. Use the S2 image pair to correlate the magnitude of the motion. Table 1 below shows how this works. Note that a one under a heading Sn means that motion was detected between image pair Sn using image based motion detection. A zero implies that the images are similar enough to not trigger the motion detection threshold for difference.

TABLE 1

| S2 | S1 | S0 | Speed |
|----|----|----|-------|
| 0 | 0 | 0 | 0 |
| 0 | 0 | 1 | S0 using S 0 pair |
| 0 | 1 | 0 | S0 using S 1 pair |
| 0 | 1 | 1 | S1 using S 1 pair |
| 1 | 0 | 0 | S0 using S 2 pair |
| 1 | 0 | 1 | S1 using S 2 pair |
| 1 | 1 | 0 | S1 using S 1 pair |
| 1 | 1 | 1 | S2 using S 2 pair |

The table and logic can be extended (adding S3, S4, etc.,) to accommodate additional image samples, and hence, additional range in the speed detection. Note that the simple binary progression and same image selection criteria outlined above may be applied. The speed estimation determines which image sample pair is used for motion detection. A validity check may be made on both of the samples to insure that each one has sufficient contrast, and that both image samples have similar constrasts. If the contrast criteria are not met, the displacement may be set to zero for both X and Y. Otherwise, the images may be correlated to determine the magnitude of motion in the X-Y plane.

The estimated speed determines which image pair to correlate in order to determine the magnitude and direction of motion. Image correlation and ratio-metric timing are interrelated. The timing ratio may be selected to be less than or equal to the number of pixels of motion that can be tolerated in either the X or Y direction. If the selected ratio is four, then the correlation can tolerate motion of up to ±4 pixels in either the X or Y direction. Selecting a lower ratio provides more overlap in the speed transition region. Using a higher ratio would produce holes in the speed detection, causing correlation failures at certain predictable velocities.

Figure 5:
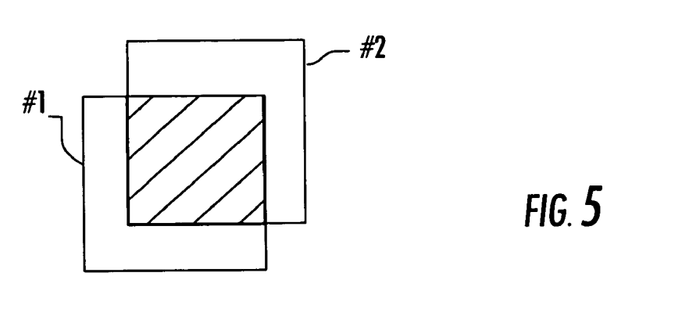
FIG. 5 is a schematic diagram of overlapping image samples as used in the finger sensing device shown in FIGS. 1 and 2.

Correlation may be obtained by comparing a reference image sample to a new image sample. A score of the number of pixels that differ is obtained, and the score may be normalized to account for the size of the image overlap area so that small overlapping regions are not unduly penalized. The normalized score is a function of the total number of matches and the total number of mismatches in the overlap region. The largest normalized score may be the winner. The correlation's area of intersection for two image samples is shown cross-hatched in FIG. 5. Of course, other correlation techniques may also be used, such as, for example comparing fixed sized kernels from two images to thereby eliminate the need to perform the normalization as will be appreciated by those skilled in the art.

Figure 6:
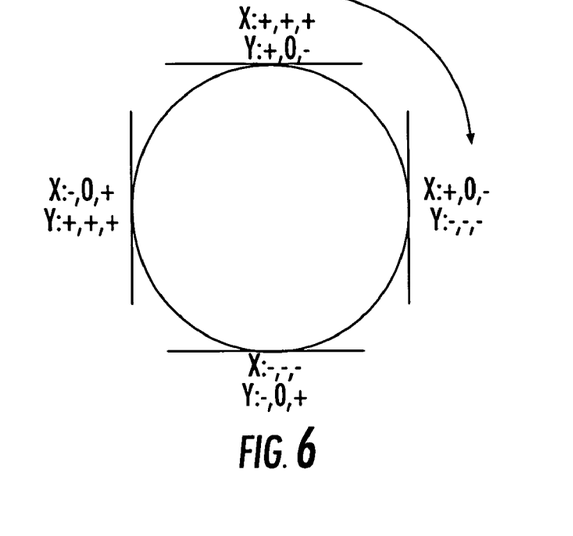
FIGS. 6-8 are schematic diagrams representing exemplary filtering effects as may be generated by the finger sensing device shown in FIGS. 1 and 2.
Figure 7:
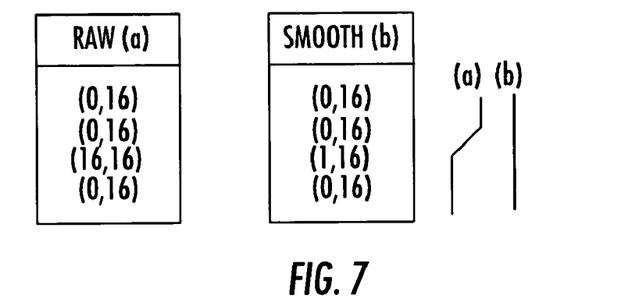
Figure 8:
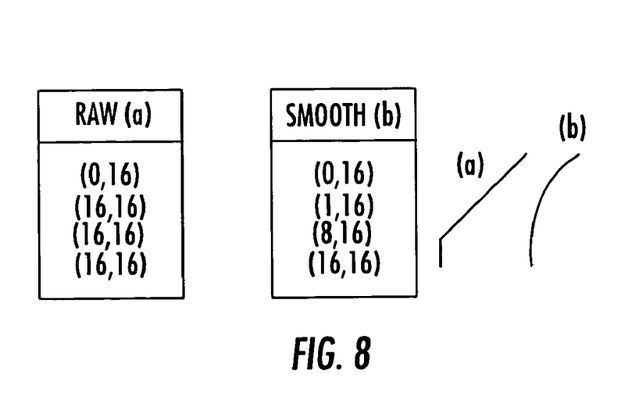

Due to the way the image samples are acquired, there is implicit filtering of motion as the speed increases. Small changes in the X direction will be filtered out when large motions are detected in the Y direction (and vice versa). In the event that an image sample was displaced by more pixels than the correlation could tolerate, a check is made to determine that the correlation score is adequate to accurately detect motion. If the score is below a threshold, the sample is filtered out and the X-Y motion is set to zero. Additional rules may be applied to the X and Y motions independently to smooth the estimated motion. Past motion history may be used to determine when a motion should be filtered out. Exemplary rules are schematically illustrated in FIGS. 6-8 and are as follows:

(1) Motion cannot change direction abruptly. Any correlation that detects a change in direction (from +X to −X for instance) is forced to go through zero first (+X, 0, −X).

(2) Speed cannot increase abruptly. Speed must ramp up from S0 to S1, and S1 to S2. It is not allowed to change from S0 to S2 in a single step.

(3) Speed is allowed to decrease abruptly. Speed can ramp down from S2 to S0 in a single step.

Figure 9:
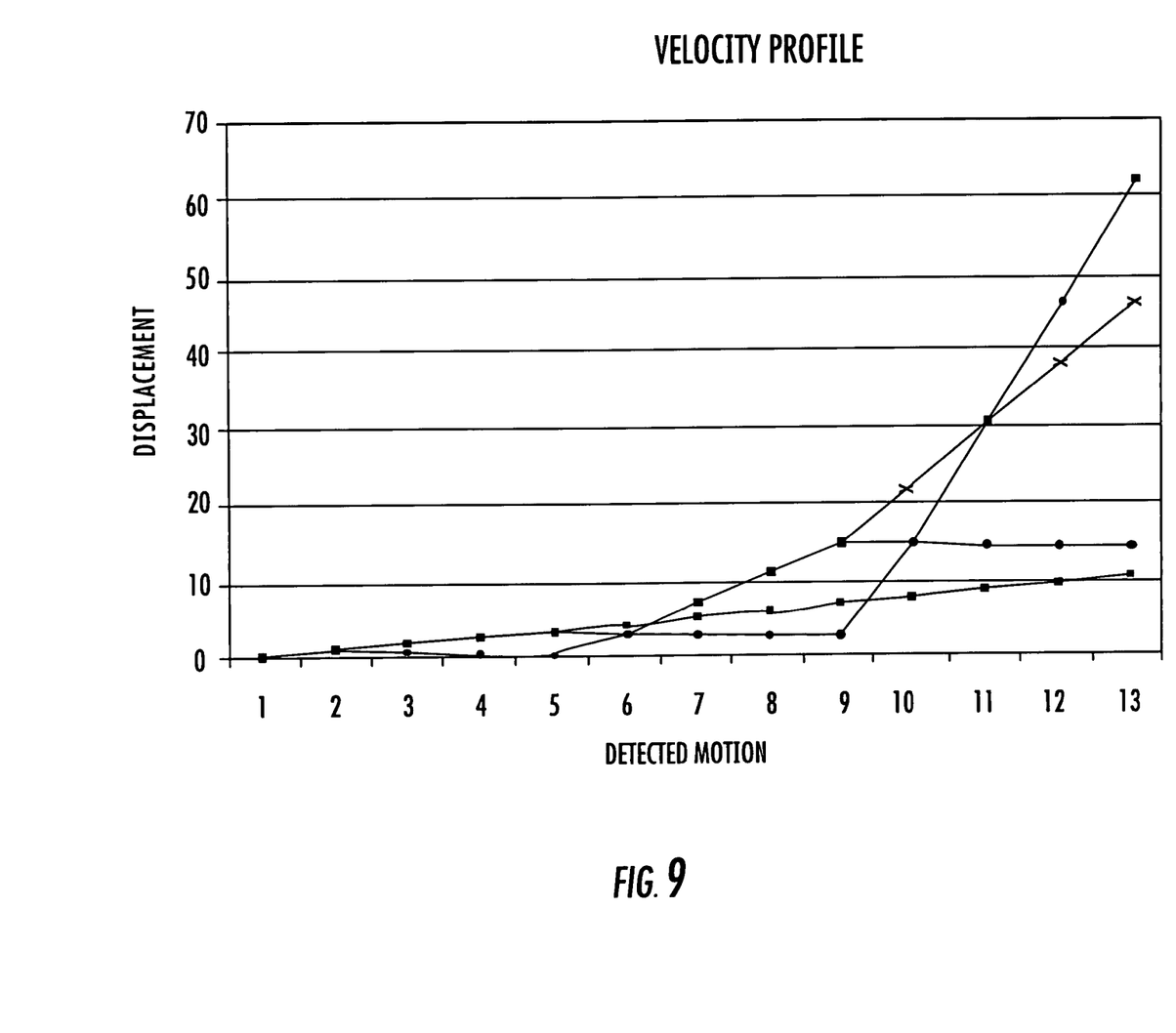
FIG. 9 includes plots of exemplary velocity and displacement profiles as may be generated by the finger sensing device shown in FIGS. 1 and 2.

Once the speed and displacement have been determined, a look-up table or piece-wise linear interpolation can be used to compute the final motion. The resultant motion can be linear or non-linear depending on the selected profile, allowing adjustment according to personal preferences. An example of the tailoring is shown in the graph of FIG. 9. The region of X[1 . . . 4] represents the slowest speed, and the region from X[9 . . . 12] represents the fastest speed in an example using 4:1 ratio-metric timing and 4:1 correlation.

Figure 10:
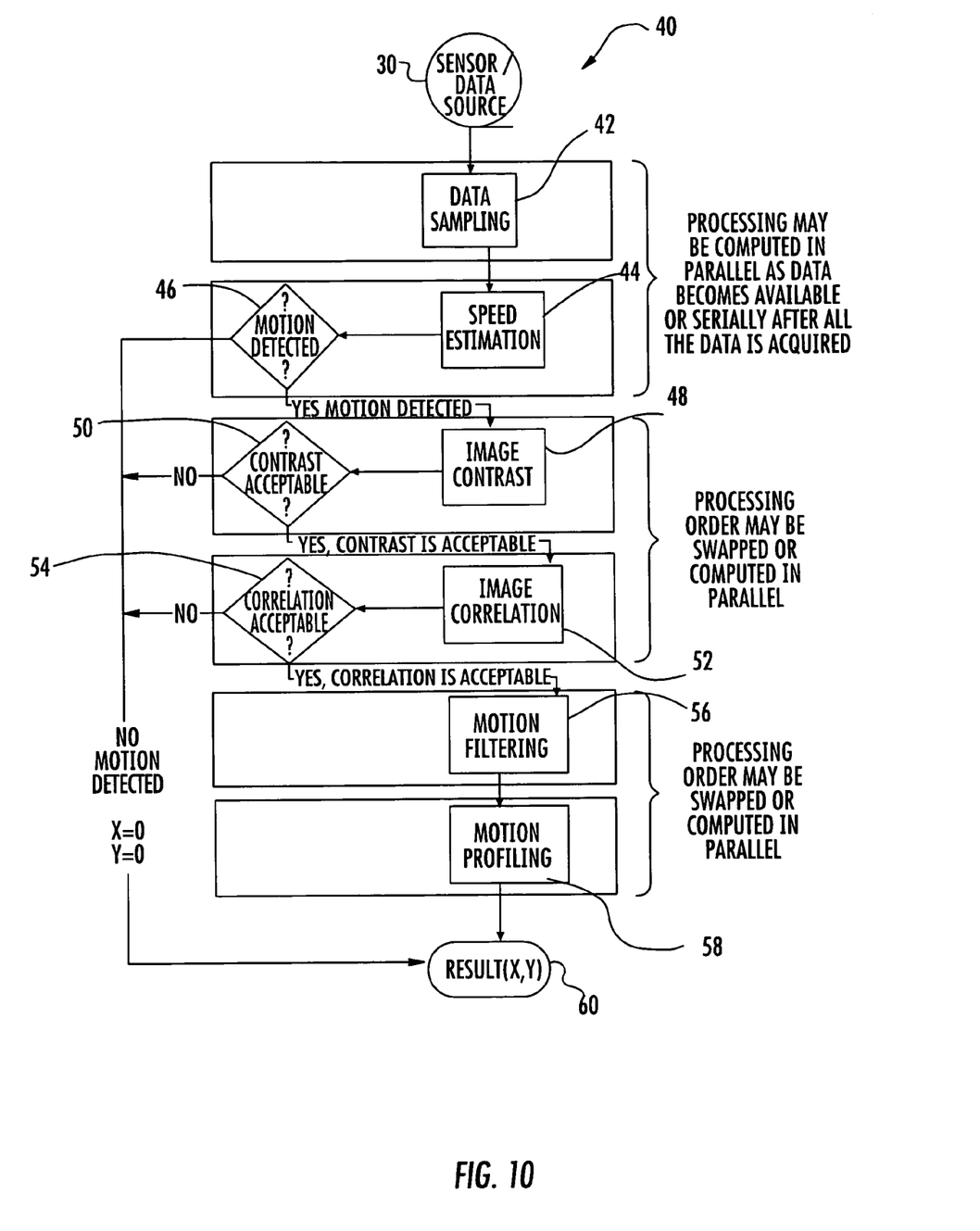
FIG. 10 is a flowchart illustrating a method as may be performed by the by the finger sensing device shown in FIGS. 1 and 2.

Turning now to the flowchart 40 of FIG. 10, method aspects are now further reviewed. The finger sensing device 30 may perform data sampling (ratio-metric) at Block 42 and thereafter perform speed estimation (Block 44). If the speed estimation indicates movement is detected at Block 46 then the image contrast is performed at Block 48. If the speed estimation indicates no movement at Block 46 then no motion is detected and the X,Y coordinates as 0,0, are reported at Block 60.

If the image contrast is acceptable at Block 50, then the image sample correlation is performed at Block 52. If the sample correlation is acceptable at Block 54 the motion filtering may be performed at Block 56, and motion profiling may be performed at Block 58 before outputting the determined X,Y coordinates at Block 60. If the image contrast is not acceptable at Block 50, or if the correlation is not acceptable at Block 54, then no motion is reported at Block 60.

Other aspects related to the finger sensing devices and methods as described herein are described in copending patent application entitled FINGER SENSOR WITH DATA THROTTLING AND ASSOCIATED METHODS, filed concurrently herewith and having Ser. No. 11/249,584, the entire disclosure of which is incorporated herein by reference. In addition, the sensor sampling and other techniques described herein may be adapted to other image sensors, such as CCD sensors, for example, wherein the finger sensing area is replaced by an image sensing area to sense a target moving in relation thereto. In addition, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A finger sensing device comprising:
   a finger sensing area to receive a user's finger moved in a sliding motion; and
   a controller cooperating with said finger sensing area for generating successive image samples at least some of which are separated by different time intervals as the user's finger is moved in a sliding motion, and for generating finger movement signals based upon the successive image samples and the different time intervals;
   said controller generating a plurality of groups of image samples, each group comprising a plurality of ratio-metrically related samples such that a ratio of times between subsequent images is constant.

2. The finger sensing device according to claim 1 wherein said finger sensing array comprises an array of sensing pixels; and wherein a ratio for the ratio-metrically related image samples is less than or equal to an expected pixel motion value.

3. The finger sensing device according to claim 1 wherein the ratio-metrically related image samples are based upon at least one of 3:1 and 4:1 ratiometrically related image samples.

4. The finger sensing device according to claim 1 wherein said controller generates a finger speed estimate based upon comparisons of image sample pairs in a given group.

5. The finger sensing device according to claim 4 wherein said controller selects and correlates an image sample pair based upon the comparisons of image sample pairs in the given group to thereby generate a finger displacement estimate.

6. The finger sensing device according to claim 5 wherein said controller performs a contrast check on the selected image sample pair.

7. The finger sensing device according to claim 5 wherein said controller generates the finger movement signals based upon the finger speed estimate and the finger displacement estimate.

8. The finger sensing device according to claim 5 wherein said controller generates the finger movement signals from the finger speed estimate and the finger displacement estimate based upon at least one of a comparison to a lookup table and a piecewise interpolation.

9. The finger sensing device according to claim 5 wherein said controller applies a set of filtering rules to at least one of the finger speed estimate and the finger displacement estimate.

10. The finger sensing device according to claim 1 wherein said controller generates finger movement signals for both X and Y directions.

11. The finger sensing device according to claim 1 wherein the image samples comprise respective subsets of image data available from said finger sensing area.

12. The finger sensing device according to claim 1 wherein said finger sensing area comprises an array of electric field sensing pixels.

13. An electronic device comprising:
   a housing;
   a display carried by said housing;
   a finger sensing area carried by said housing to receive a user's finger moved in a sliding motion; and
   a controller cooperating with said finger sensing area for generating successive image samples at least some of which are separated by different time intervals as the user's finger is moved in a sliding motion, and for generating finger movement signals for at least one navigation operation on said display and based upon the successive image samples and the different time intervals;
   said controller generating a plurality of groups of image samples, each group comprising a plurality of ratio-metrically related samples such that a ratio of times between subsequent images is constant.

14. The electronic device according to claim 13 wherein said finger sensing array comprises an array of sensing pixels; and wherein a ratio for the ratio-metrically related image samples is less than or equal to an expected pixel motion value.

15. The electronic device according to claim 13 wherein said controller generates a finger speed estimate based upon comparisons of image sample pairs in a given group.

16. The electronic device according to claim 15 wherein said controller selects and correlates an image sample pair based upon the comparisons of image sample pairs in the given group to thereby generate a finger displacement estimate.

17. The electronic device according to claim 16 wherein said controller performs a contrast check on the selected image sample pair.

18. The electronic device according to claim 16 wherein said controller generates the finger movement signals based upon the finger speed estimate and the finger displacement estimate.

19. The electronic device according to claim 16 wherein said controller generates the finger movement signals from the finger speed estimate and the finger displacement estimate based upon at least one of a comparison to a lookup table and a piecewise interpolation.

20. The electronic device according to claim 16 wherein said controller applies a set of filtering rules to at least one of the finger speed estimate and finger displacement estimate.

21. The electronic device according to claim 13 wherein said controller generates finger movement signals for both X and Y directions.

22. The electronic device according to claim 13 wherein the image samples comprise respective subsets of image data available from said finger sensing area.

23. The electronic device according to claim 13 wherein said finger sensing area comprises an array of electric field sensing pixels.

24. A method of generating finger movement signals using a finger sensing device comprising a finger sensing area to receive a user's finger moved in a sliding motion, and a controller connected to the finger sensing area, the method comprising:

using the controller in cooperation with the finger sensing area for generating successive image samples at least some of which are separated by different time intervals as the user's finger is moved in a sliding motion, and for generating finger movement signals based upon the successive image samples and the different time intervals;

using the controller for generating a plurality of groups of image samples, each group comprising a plurality of ratio-metrically related samples such that a ratio of times between subsequent images is constant.

25. The method according to claim 24 wherein the finger sensing array comprises an array of sensing pixels; and wherein a ratio for the ratio-metrically related image samples is less than or equal to an expected pixel motion value.

26. The method according to claim 24 wherein the controller generates a finger speed estimate based upon comparisons of image sample pairs in a given group.

27. The method according to claim 26 wherein the controller selects and correlates an image sample pair based upon the comparisons of image sample pairs in the given group to thereby generate a finger displacement estimate.

28. The method according to claim 27 wherein the controller generates the finger movement signals based upon the finger speed estimate and the finger displacement estimate.

29. The method according to claim 28 wherein the controller applies a set of filtering rules to at least one of the finger speed estimate and the finger displacement estimate.

30. The method according to claim 24 wherein the controller generates finger movement signals for both X and Y directions.

31. The method according to claim 24 wherein the image samples comprise respective subsets of image data available from the finger sensing area.

32. The method according to claim 24 wherein the finger sensing area comprises an array of electric field sensing pixels.

33. An image sensing device comprising:

an image sensing area for sensing target movement; and a controller cooperating with said image sensing area for generating successive image samples at least some of which are separated by different time intervals as the user's finger is moved in a sliding motion, and for generating target movement signals based upon the successive image samples and the different time intervals;

said controller generating a plurality of groups of image samples, each group comprising a plurality of ratio-metrically related samples such that a ratio of times between subsequent images is constant.

34. The image sensing device according to claim 33 wherein said image sensing array comprises an array of sensing pixels; and wherein a ratio for the ratio-metrically related image samples is less than or equal to an expected pixel motion value.

35. The image sensing device according to claim 33 wherein the ratio-metrically related image samples are based upon at least one of 3:1 and 4:1 ratio-metrically related image samples.

36. The image sensing device according to claim 33 wherein said controller generates a target speed estimate based upon comparisons of image sample pairs in a given group.

37. The image sensing device according to claim 36 wherein said controller selects and correlates an image sample pair based upon the comparisons of image sample pairs in the given group to thereby generate a target displacement estimate.

38. The image sensing device according to claim 37 wherein said controller performs a contrast check on the selected image sample pair.

39. The image sensing device according to claim 37 wherein said controller generates the target movement signals based upon the target speed estimate and the target displacement estimate.

40. The image sensing device according to claim 37 wherein said controller generates the target movement signals from the target speed estimate and the target displacement estimate based upon at least one of a comparison to a lookup table and a piecewise interpolation.

41. The image sensing device according to claim 37 wherein said controller applies a set of filtering rules to at least one of the target speed estimate and the target displacement estimate.

42. The image sensing device according to claim 33 wherein said controller generates target movement signals for both X and Y directions.

43. The image sensing device according to claim 33 wherein the target image samples comprise respective subsets of image data available from said image sensing area.

44. The image sensing device according to claim 33 wherein said image sensing area comprises an array of electric field sensing pixels.

* * * * *

UNITED STATES PATENT AND TRADEMARK OFFICE
CERTIFICATE OF CORRECTION

PATENT NO. : 7,693,314 B2
APPLICATION NO. : 11/249585
DATED : April 6, 2010
INVENTOR(S) : Tykowski et al.

It is certified that error appears in the above-identified patent and that said Letters Patent is hereby corrected as shown below:

| | |
|---|---|
| Title Page, Other Publications | Delete: "www.fma.fulitsu.com" Insert: --www.fma.fujitsu.com-- |
| Column 2, Line 17 | Delete: "reducing" Insert: --reduced-- |
| Column 3, Line 13 | Delete: "is schematic" Insert: --is a schematic-- |
| Column 3, Line 17 | Delete: "is more" Insert: --is a more-- |
| Column 3, Line 33 | Delete: "by the by the" Insert: --by the-- |
| Column 3, Line 48 | Delete: "indicate" Insert: --and indicate-- |
| Column 6, Line 7 | Delete: "S" Insert: --S1-- |
| Column 8, Line 37 | Delete: "lookup" Insert: --look-up-- |
| Column 8, Line 38 | Delete: "piecewise" Insert: --piece-wise-- |
| Column 9, Line 24 | Delete: "lookup" Insert: --look-up-- |

Signed and Sealed this

Twenty-first Day of September, 2010

David J. Kappos
*Director of the United States Patent and Trademark Office*

CERTIFICATE OF CORRECTION (continued)
U.S. Pat. No. 7,693,314 B2

Column 9, Line 25        Delete: "piecewise"
                                                        Insert: --piece-wise--

Column 10, Line 51       Delete: "lookup"
                                                         Insert: --look-up--

Column 10, Line 52       Delete: "piecewise"
                                                         Insert: --piece-wise--